United States Patent
Calabria et al.

(10) Patent No.: US 7,041,245 B1
(45) Date of Patent: *May 9, 2006

(54) METHOD FOR FORMING GOLF BALL WITH POLYURETHANE

(75) Inventors: John Calabria, Fairhaven, MA (US); Dean A. Snell, North Dartmouth, MA (US); Shenshen Wu, North Dartmouth, MA (US)

(73) Assignee: Acushnet Company, Fairhaven, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/482,338

(22) Filed: Jan. 14, 2000

Related U.S. Application Data

(63) Continuation of application No. 09/206,400, filed on Dec. 7, 1998, now Pat. No. 6,042,768, which is a continuation of application No. 08/992,835, filed on Dec. 17, 1997, now Pat. No. 5,888,437, which is a continuation of application No. 08/432,657, filed on May 2, 1995, now Pat. No. 5,733,428, which is a continuation of application No. 08/185,667, filed on Jan. 21, 1994, now abandoned, which is a continuation-in-part of application No. 07/909,543, filed on Jul. 6, 1992, now abandoned.

(51) Int. Cl.
*B29C 43/18* (2006.01)

(52) U.S. Cl. ............... 264/135; 264/254; 264/275; 264/279.1

(58) Field of Classification Search ............ 264/135, 264/248, 254, 275, 279.1
See application file for complete search history.

(56) References Cited

U.S. PATENT DOCUMENTS

| 696,353 A | 3/1902 | Richards |
| 721,462 A | 2/1903 | Richards |
| 2,361,348 A | 10/1944 | Dickson et al. ............... 18/30 |
| 2,940,128 A | 6/1960 | Bowerman et al. |
| 3,068,522 A | 12/1962 | Nickerson et al. ............ 18/36 |
| 3,112,521 A | 12/1963 | Ward |
| 3,130,102 A | 4/1964 | Watson et al. ............. 156/228 |
| 3,147,324 A | 9/1964 | Ward ......................... 264/254 |
| 3,177,280 A | 4/1965 | Ford et al. ................. 264/275 |
| 3,933,967 A | 1/1976 | Taylor ....................... 264/248 |
| 3,979,126 A | 9/1976 | Dusbiber ................... 372/218 |
| 3,989,568 A | 11/1976 | Isaac ......................... 156/182 |
| 4,056,269 A | 11/1977 | Pollitt et al. ............... 273/218 |

(Continued)

FOREIGN PATENT DOCUMENTS

EP  0 241 009  10/1987

(Continued)

OTHER PUBLICATIONS

U.S. Appl. No. 09/296/197.

Primary Examiner—Edmund H. Lee
(74) Attorney, Agent, or Firm—Bingham McCutchen LLP

(57) ABSTRACT

A method of making a golf ball having a core and polyurethane including the following steps. A first portion of polyurethane is placed in a first cavity, and the first portion of polyurethane is allowed to partially cure to a selected state of gel. The core is positioned within the cavity while the core is vertically and laterally centered within the cavity. A second portion of polyurethane is placed in a second cavity at a time subsequent to placing the first portion of polyurethane in the first cavity. The second portion of polyurethane is allowed to partially cure, and the first and second cavities are mated together to cure the polyurethane around the core.

21 Claims, 16 Drawing Sheets

U.S. PATENT DOCUMENTS

| | | | |
|---|---|---|---|
| 4,123,061 A | 10/1978 | Dusbiber | 273/220 |
| 4,203,941 A | 5/1980 | Brooker | 264/250 |
| 4,272,079 A | 6/1981 | Nakade et al. | 273/225 |
| 4,410,387 A | 10/1983 | Halkerston et al. | 156/245 |
| 4,653,758 A | 3/1987 | Solheim | 273/232 |
| 4,714,253 A | 12/1987 | Nakahara et al. | 273/228 |
| 4,858,924 A | 8/1989 | Saito et al. | 273/62 |
| 4,959,000 A | 9/1990 | Giza | 425/129.1 |
| 5,002,281 A | 3/1991 | Nakahara et al. | 273/220 |
| 5,006,288 A | 4/1991 | Rhodes, Jr. et al. | 264/275 |
| 5,006,297 A | 4/1991 | Brown et al. | 264/275 |
| 5,048,838 A | 9/1991 | Chikaraishi et al. | 273/228 |
| 5,112,556 A | 5/1992 | Miller | 425/595 |
| 5,194,191 A | 3/1993 | Nomura et al. | 264/25 |
| 5,334,673 A | 8/1994 | Wu | 273/235 R |
| 5,367,028 A | 11/1994 | Hamada et al. | 525/221 |
| 5,390,932 A | 2/1995 | Russo, Sr. | 273/220 |
| 5,439,227 A | 8/1995 | Egashira et al. | 273/228 |
| 5,704,854 A | 1/1998 | Higuchi et al. | 473/373 |
| 5,725,442 A | 3/1998 | Higuchi et al. | 473/376 |
| 5,733,206 A | 3/1998 | Nesbitt et al. | 473/377 |
| 5,779,562 A | 7/1998 | Melvin et al. | 473/373 |
| 5,798,071 A | 8/1998 | Boehm | 264/275 |
| 5,879,244 A | 3/1999 | Hwang | 473/373 |
| 6,117,024 A | 9/2000 | Dewanjee | 473/351 |
| 6,200,512 B1 | 3/2001 | Dewanjee et al. | 264/250 |

FOREIGN PATENT DOCUMENTS

| | | |
|---|---|---|
| EP | 0 578 466 | 1/1994 |
| JP | 10-33716 | 2/1998 |
| WO | WO87/01673 | 3/1987 |

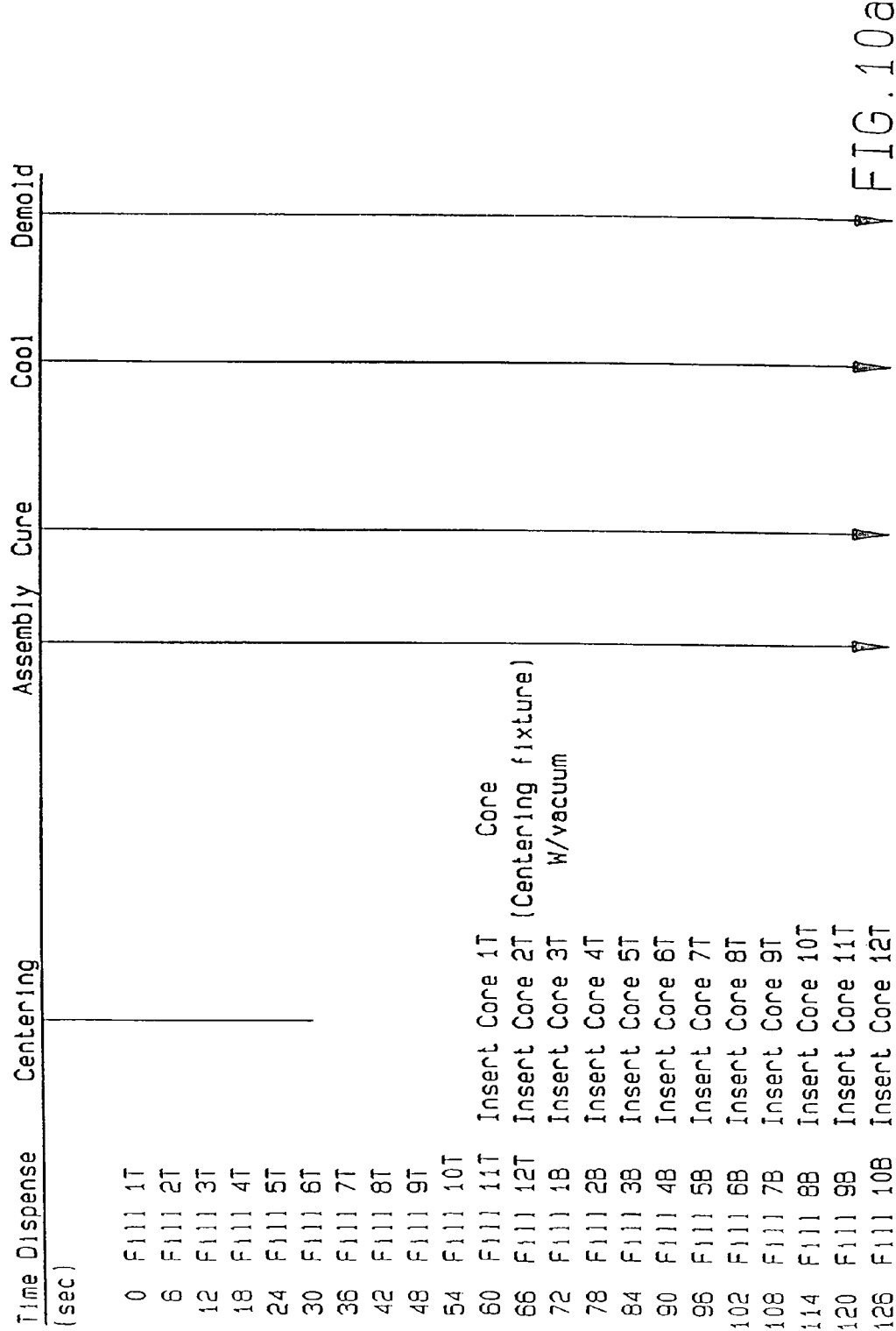

METHOD FOR FORMING GOLF BALL WITH POLYURETHANE

This is a continuation, division, of application Ser. No. 09/206,400, filed Dec. 7, 1998.

CROSS REFERENCE TO RELATED APPLICATIONS

This application is a continuation of application Ser. No. 09/206,400, filed Dec. 7, 1998, now U.S. Pat. No. 6,042,768, which is a continuation of application Ser. No. 08/992,835 filed Dec. 17, 1997, now U.S. Pat. No. 5,888,437, which is a continuation of application Ser. No. 08/432,657 filed May 2, 1995, now U.S. Pat. No. 5,733,428, which is a continuation of application Ser. No. 08/185,667 filed Jan. 21, 1994, now abandoned, which is a continuation-in-part of application Ser. No. 07/909,543 filed Jun. 6, 1992 now abandoned.

BACKGROUND OF THE INVENTION

The use of urethane polymers has been proposed for golf ball cover compositions. One patent teaches initially forming two urethane shell blanks from which cover halves are made (U.S. Pat. No. 3,989,568). Another patent suggests forming a smooth cover and thereafter impressing dimples in the smooth cover (U.S. Pat. No. 5,006,297). Still another patent describes a sequence of filling first half of a mold with urethane, inserting a ball center therein and later adding more urethane to a second half and uniting the second with the first half (U.S. Pat. No. 3,147,324).

SUMMARY OF THE INVENTION

Broadly, the present invention is a method and apparatus for making a golf ball comprising treating a core as described herein, placing a polyurethane cover of selected composition thereon in which the treated core is positioned in a mold using a controlled alignment device for centering the core during cover formation.

DESCRIPTION OF THE PREFERRED EMBODIMENT

Figure 1:
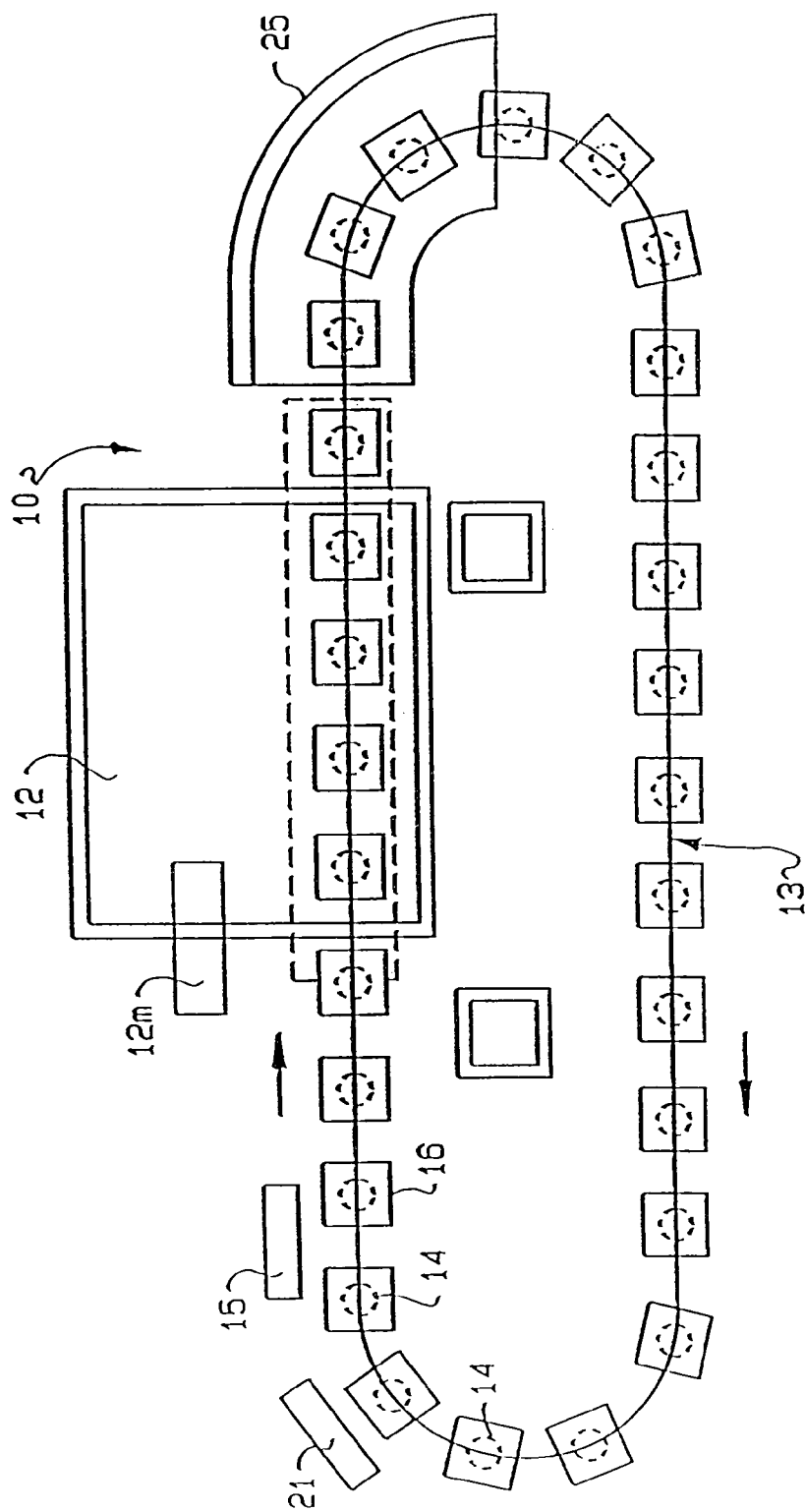
FIG. 1 is plan view of the core treating apparatus.
Figure 2:
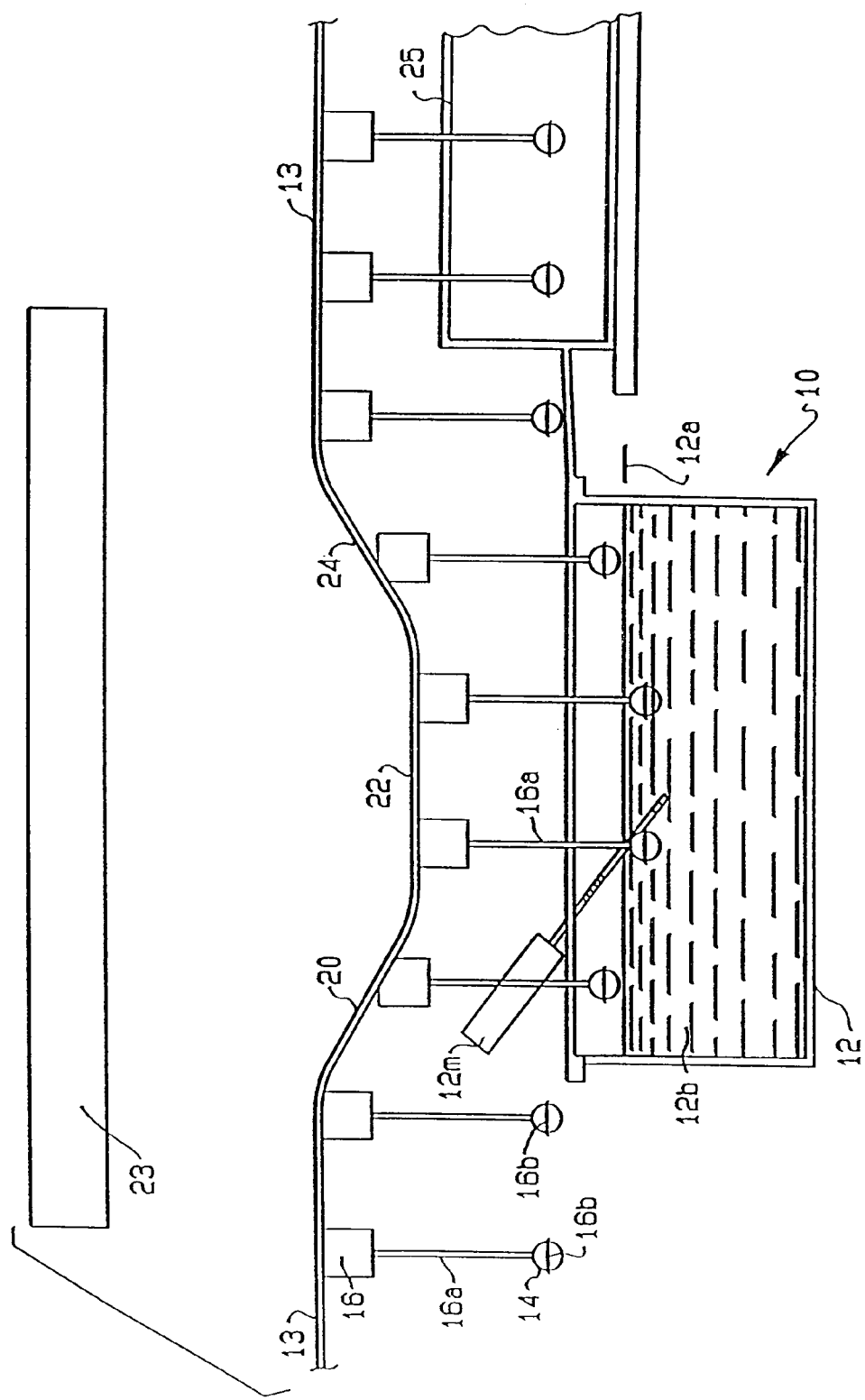
FIG. 2 is an elevational view of such apparatus.

Turning to the Figures, and in particular to FIGS. 1 and 2, dipping apparatus 10 includes a dip tank 12 filled to level 12a and agitated by electric mixer 12m. Apparatus 10 also includes oval conveying rack 13 with ball core carriers 16. Dip tank 12 is filled with latex bath 12b to level 12a and, if latex has been in tank 12 for a substantial length of time, initial mixing of bath 12b in tank 12 should be carried out until uniformity of bath 12b is reached. After such mixing golf ball cores 14 are loaded at loading station 15 into holding carriers 16 each comprising a stem 16a and a holder ring 16b. During normal operation tank 12 is agitated by electric mixer 12m. Loaded carriers 16 are carried by conveying rack 13 along and down to dip cores 14 for 1 to 60 seconds into latex bath 12b. Rack 13 moves through a descending portion 20, dipping portion 22 and ascending portion 24 of the carrier circuit to accomplish the latex dip core treatment. In wound cores the latex encapsulates the core with penetrate to a depth of about 0.050 inch and in solid cores the latex forms an encapsulating coating on the core of 0.001–0.010 inch thick.

After the ball cores 14 exit dip tank 12, they pass into a curing chamber 25 in which heat, ultraviolet rays, or other means for accelerating cure may be applied. It will be understood that some latex bath materials cure sufficiently under ambient conditions that curing chamber 25 is not required. Cores are unloaded at unload station 21.

In accordance with this invention, wound cores 14 preferably are latex dipped while dipping of solid cores 14 is optional. Depending on the nature of the latex material applied, the golf ball dip-treated cores 14 can then be stored for a period of time for additional cure, or, if the latex material is sufficiently cured at this point, the wound cores with the latex dip encapsulate can be transported directly to the molding area for molding of the cover material.

Since the latex material generates low levels of ammonia fumes in the dip tank 12, it is preferred to have a vacuum hood 23 positioned above the dip tank 12. The vacuum hood 23 is preferably provided with means (not shown) for generating a clean air curtain about the periphery of the dip tank 12 to prevent escape of undesirable gasses. The curing chamber 25 can also be provided with suitable gas removal means.

As described above, the initial step of the process of the present invention is the dipping of the core in a latex bath. The preferred core is a wound core but any core, molded or wound, may be treated by the present process. With a molded core the advantage of such latex dip treatment is the increased velocity attainable to golf balls made with such cores. With a wound core the advantages are increased velocity, reduction of flow of air into the cover material during cover formation and prevention of rubber strand unravelling.

It is important that a thermosetting, not a thermoplastic, latex be employed so that the arrangement of the cover material to the core encapsulated will not soften the encapsulating envelope and permit air to pass through it into the interstices in the windings of the wound core or allow the rubber strands to unravel.

The thermosetting latex materials which are useful in the present invention are any materials which will withstand the temperatures at which the cover material is to be applied. This temperature will, of course, depend upon the particular fluidization temperature of the selected cover material. Typical thermosetting latex materials which can be used are: low ammonia, natural latex or pre-vulcanized natural latex with or without penetrant. When using a polyurethane cover material, it has been found that pre-vulcanized natural latex is particularly suitable.

The preferred latex material, Heveatex brand Model H1704 pre-vulcanized natural latex, is a partially pre-vulcanized material which has a 60%–30% water dilution solids content. The preferred penetrant material is Niaproof #4 (tetra decyl sulfate) sold by Niacet Corp. It is understood that non-latex encapsulating materials may also be used.

After latex coating, the cover is formed around the coated core by mixing and introducing the material in mold halves. Once mixed, an exothermic reaction commences and continues. It is important that the viscosity be measured over time, so that the subsequent steps of filling each mold half, introducing the core into one half and closing the mold can be properly timed for accomplishing centering of the core cover halves fusion and achieving overall uniformity.

Figure 8:
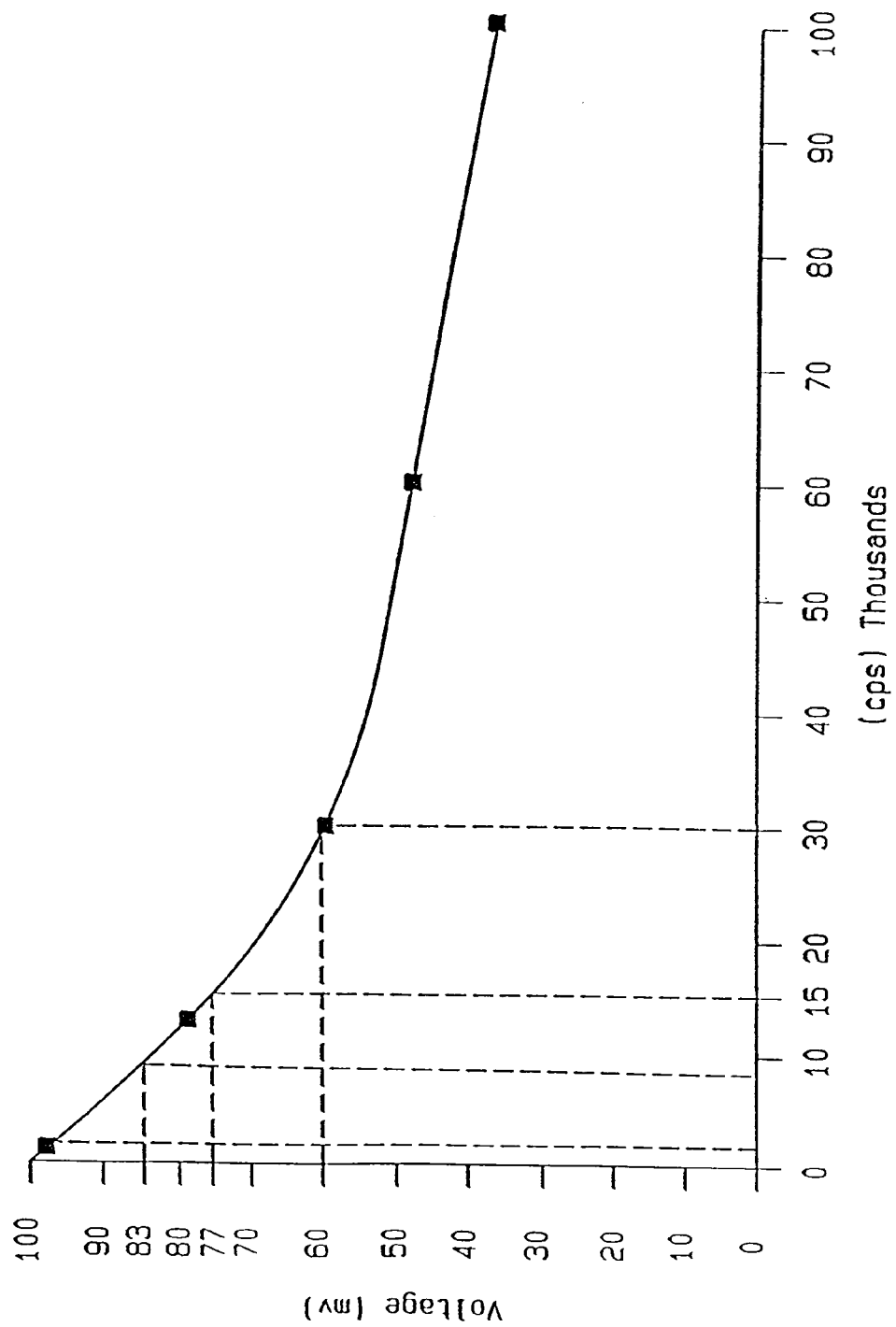
FIG. 8 is a graph plotting voltage vs. cps.
Figure 9:
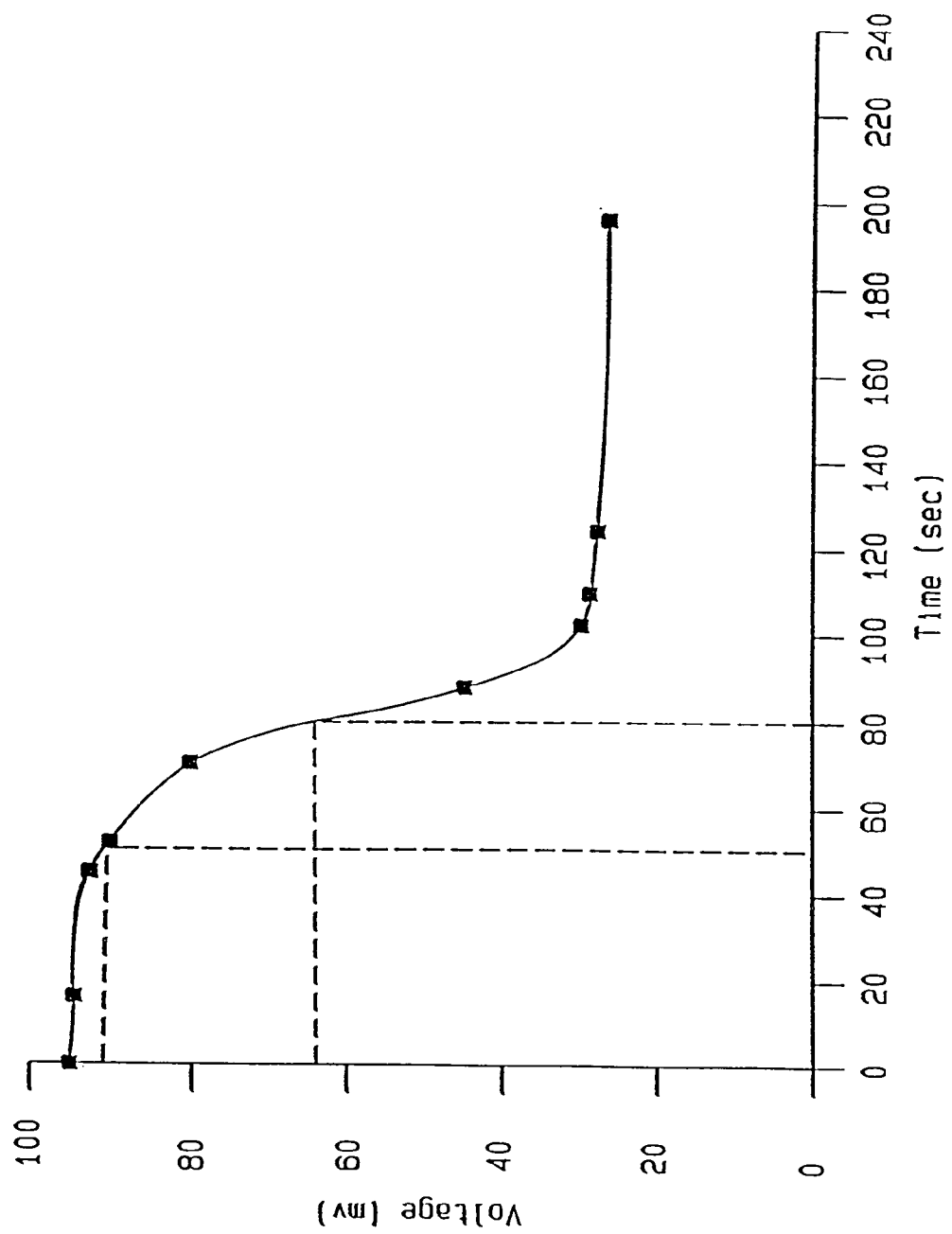
FIG. 9 is a graph plotting voltage vs. time.

The increase in the viscosity of the urethane mix over time is measured by Vibrating Needle Curemeter (VNC) manufactured by Rapra Technology Limited. It is achieved by suspending a steel needle in the curing formulation. The needle is vibrated vertically by a small electrodynamic vibrator driven by a signal generator. Resistance to its movement is ultimately recorded as the voltage output. Suitable viscosity range of the curing urethane mix for introducing cores 14 into the mold halves 51, 59 is determined to be approximately between 2,000 cps –30,000 cps or between 60 mv –98 mv voltage output with the preferred range of 8,000 to 15,000 cps (see FIG. 8). The time (gel time) at which the desired viscosity range occurs for mold mating is measured from first introduction of mix into the top half mold 51a.

The dip coating of latex penetrates the interstices, crevices and openings between the wound core threads to a depth of a fraction of an inch preferable about 0.050 inches and, as solidified, prevents a substantial quantity of air from flowing from the interior of the core into the cover during its formation. A negligible amount of the latex remains on the outside of the wound core. With solid cores about 0.001–0.010 inch is coated on the surface thus reducing the cover thickness by that amount. Small amounts of air passing through or around the latex coating are not large enough to create noticeable imperfections in the cover as determined by visual inspection.

Figure 3:
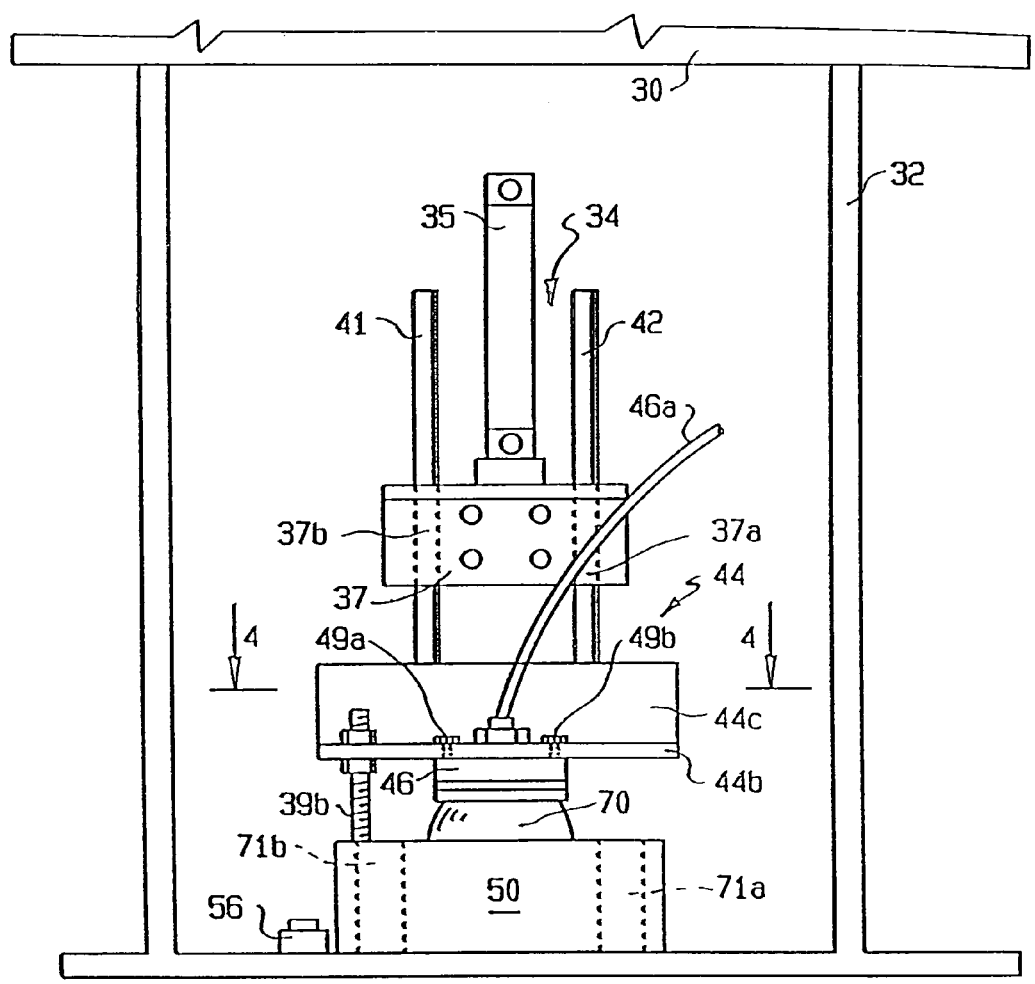
FIG. 3 is an elevational view of alignable device for placing a treated core in a mold half.
Figure 3A:
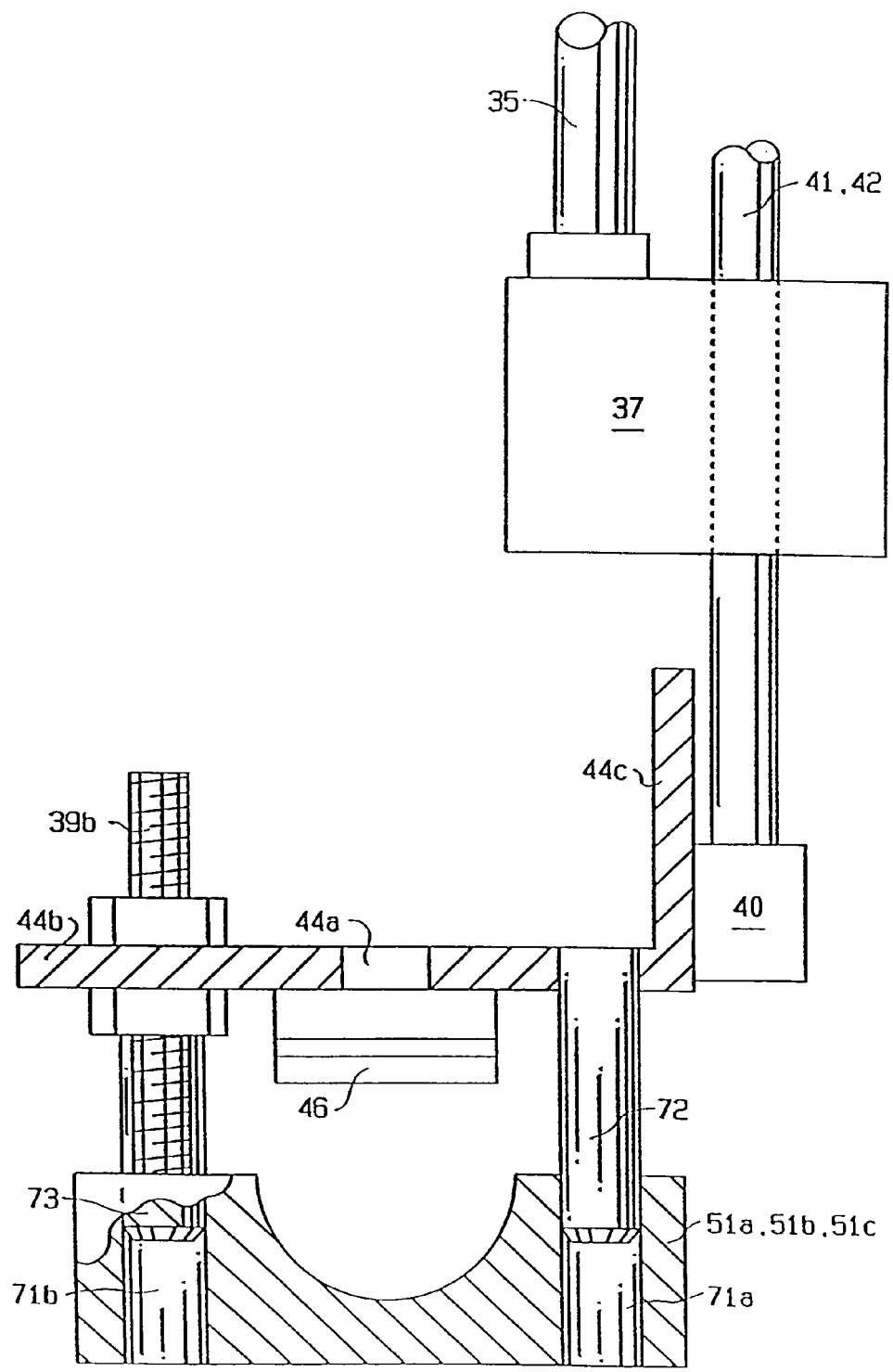
FIG. 3a is a partial side elevational view of the alignable device.
Figure 4:
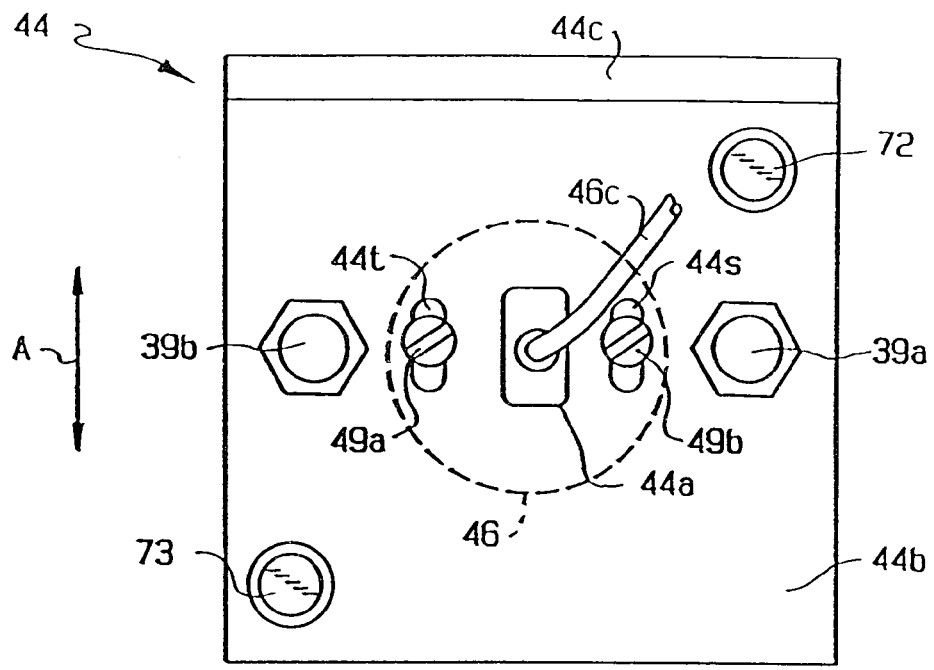
FIG. 4 is a sectional view along line 4—4 of FIG. 3.

Turning to FIGS. 3 and 3a, another step of the process is the formation of the cover on the wound core 12. To accomplish this step a centering fixture is used. Fixture unit 30 includes box frame 32, stationary central guide mount 34 comprising fixed cylinder 35 and stationary guide block 37. Guide block 37 has two (2) parallel passageways 37a, 37b therethrough for receiving movable rods 41, 42 in sliding vertical movement. Rods 41, 42 are fixed to slide ball cup frame unit 44, through back piece 40, which unit 44 carries ball cup 46 mounted on cup plate 44b as described (see FIG. 3a). Ball cup 46 holds ball core 14 through reduced pressure (or partial vacuum) in hose 46a. Ball cup frame unit 44 includes base plate 44b, central opening 44a and upstanding back plate 44c. Back support 40 is secured to back plate 44c. Ball cup 46 is adjustably secured to cup plate 44b through adjustable fasteners 49a, b which ride in slots 44s and 44t (FIG. 4). Cup 46 can be adjusted vis-a-vis plate 44b front and back along arrow A (FIG. 4).

Figure 7:
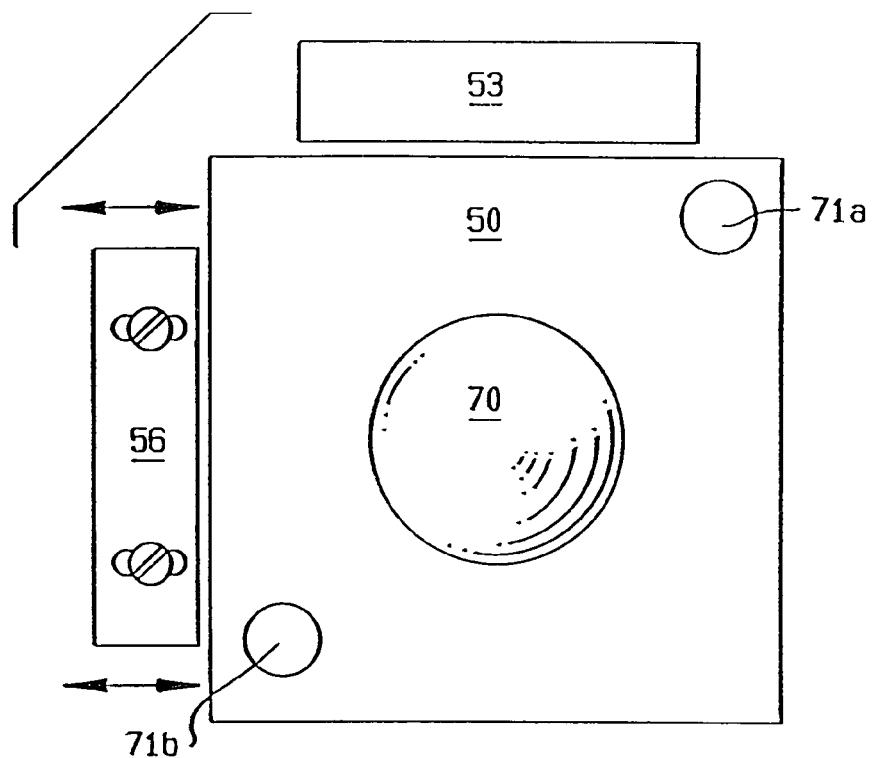
FIG. 7 shows a plan view of set-up mold.
Figure 7A:
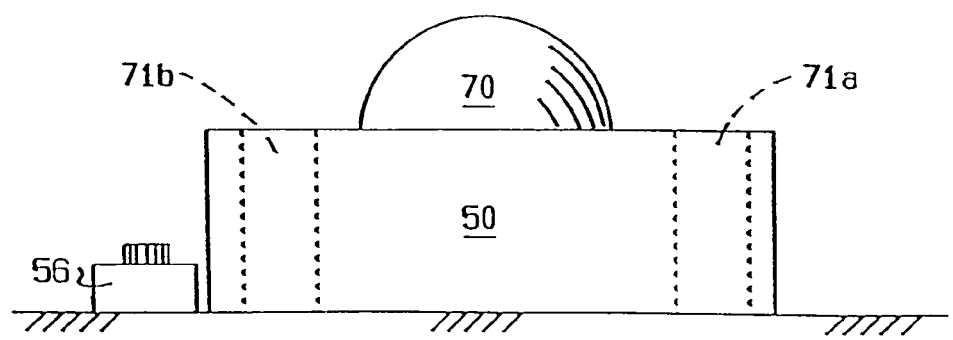
FIG. 7a shows a side view of set-up core with alignment holes.

To initially align ball core cup 46 in the proper position for molding of cover material, a machined metal set-up mold 50 is used. Set-up mold 50 is positioned by lowering unit 44 to permit pins 72, 73 to pass through alignment holes 71a, 71b in mold 50. Rails 53 and 56 serve only to assist in placing the mold 50 under unit 44 and after mold 50 is properly aligned it is spaced a few thousandths of an inch from each rail 53, 56 (FIG. 7). With ball cup 46 free through loosened fasteners 49a, b, alignment of cup 46 is accomplished by lowering ball cup 46 until it sits on and contacts set-up core 70. Fasteners 49a, b are tightened when flush contact with ball cup 46 and set-up core 70 has been made. Next, mechanical stop 39b is tightened in this position. Frame unit 44 is then raised from set-up mold 50 and set-up mold 50 is removed from fixture 30.

More than one fixture unit 30 is used in the practice of this invention. With fixture unit 30 so aligned, the set-up mold 50 is removed and is ready to be replaced with a ball core 14 and a series of regular mold halves 51b, 51c, etc.

The core is centered by fixture unit 30 in the top mold half, as then inverted, to a tolerance of about 0.010 of an inch. Such tolerance is described by determining the theoretical center of the core in the mold half and tolerating the actual core center, as fixtured, to be located up to 0.005 of an inch in any direction for the theoretical center. Since the actual center is tolerated to move 0.005 inch in any direction from the theoretical center, it can move over a range of 0.010 of an inch.

Figure 5:
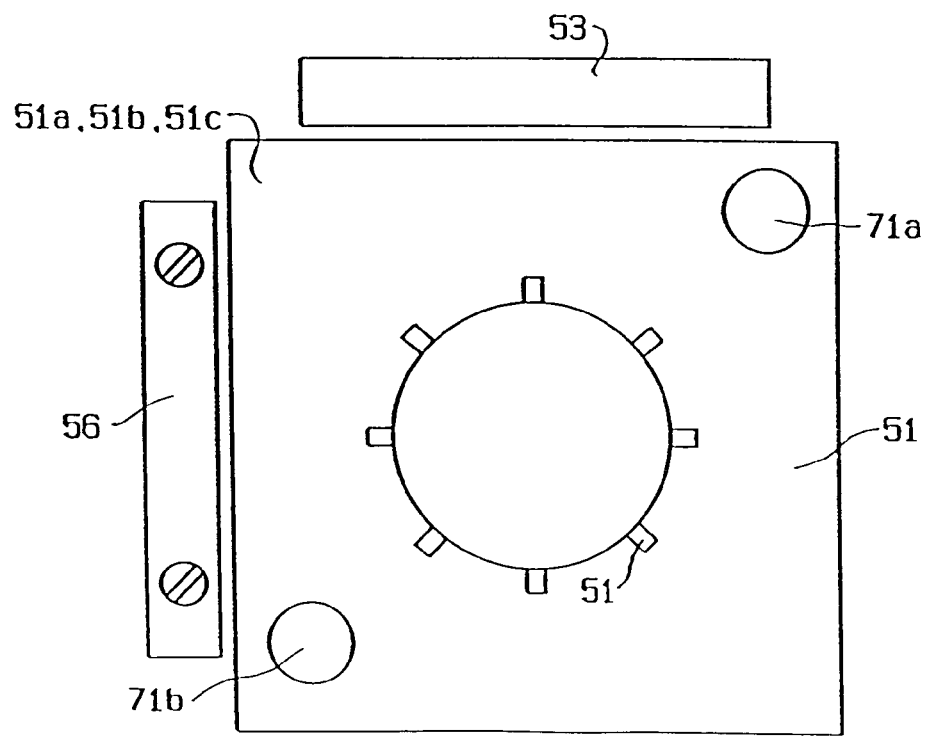
FIG. 5 is a plan view showing a mold being positioned in the alignment device.
Figure 13:
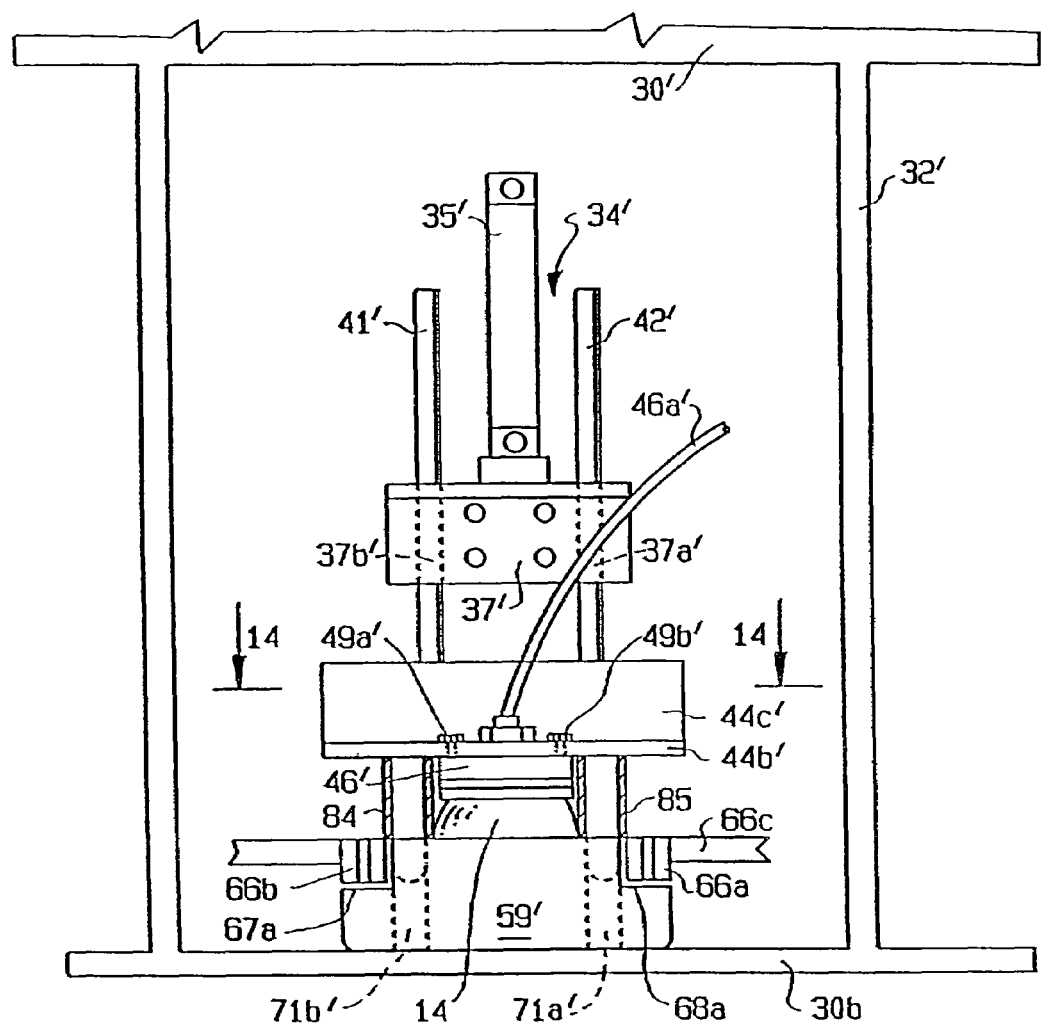
FIG. 13 is a front elevational view of an alternative embodiment of the core alignment device.
Figure 13A:
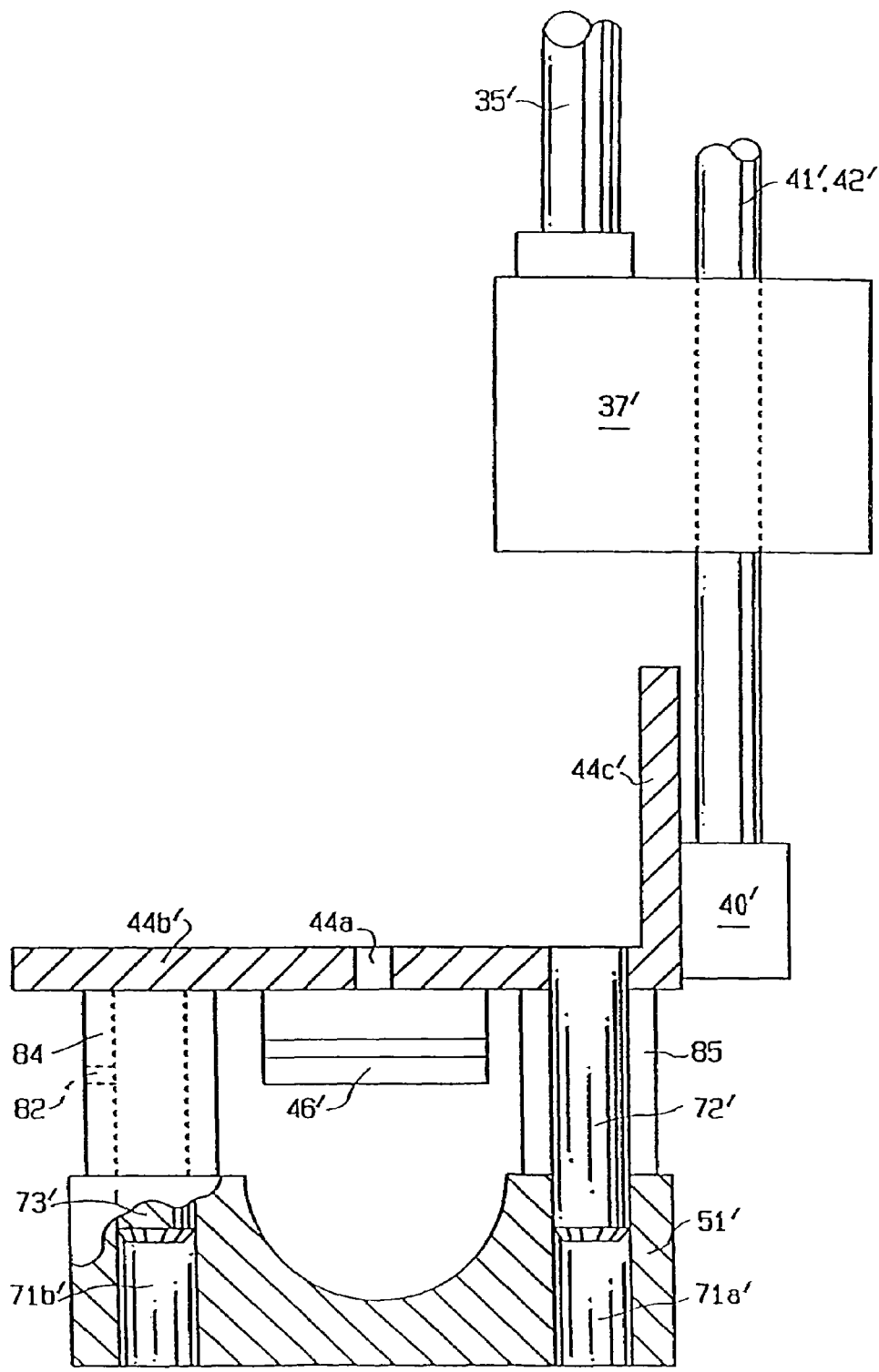
FIG. 13a is a side elevational view of the alignment device.
Figure 14:
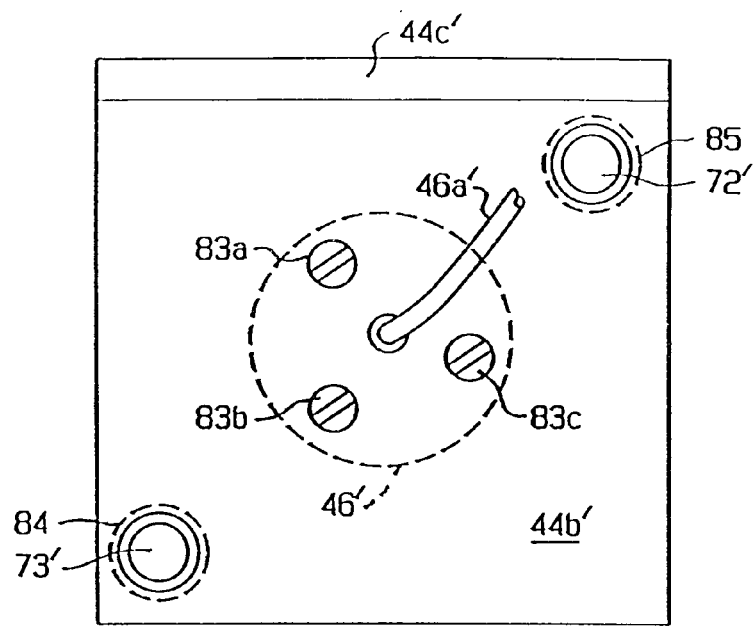
FIG. 14 is a sectional view along line 14—14 of FIG. 3.
Figure 15:
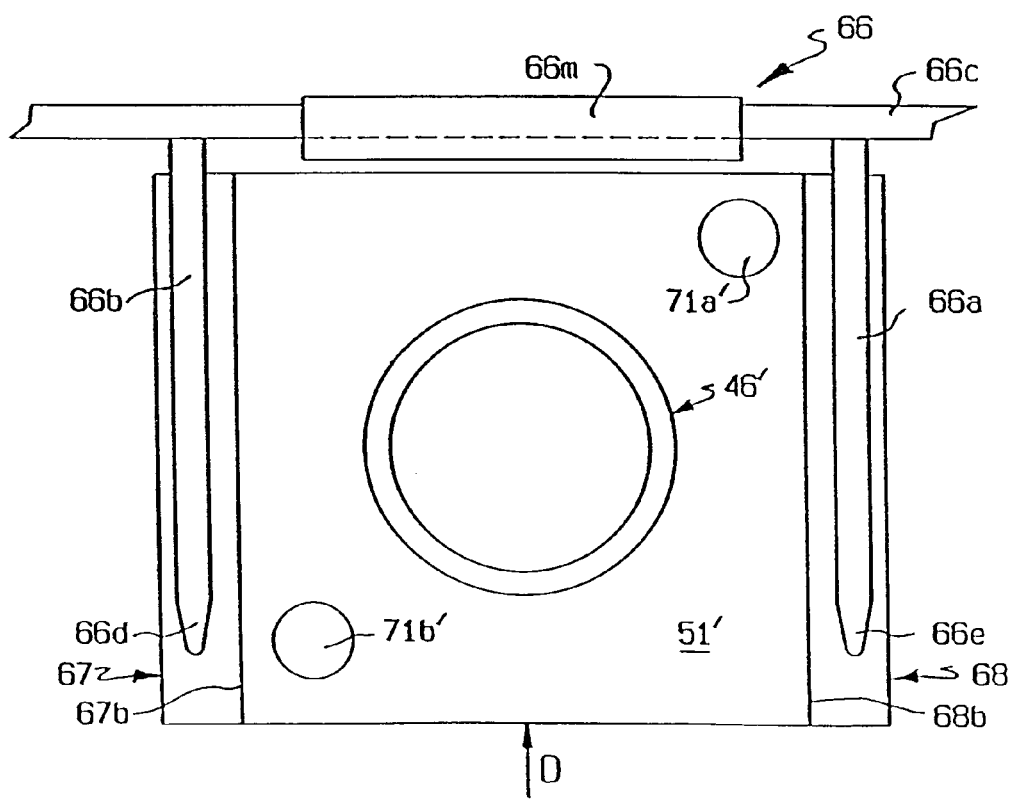
FIG. 15 is a plan view of a mold half with a horizontal aligning rail unit.

Turning to FIGS. 13–15, prime numbered elements correspond to elements on FIGS. 3–5. This alternative embodiment aligns each mold half 51, 59 with respect to the fixture frame base 30b of frame 30' using a horizontal rail alignment unit 66 which includes stationary mount block 66m, positioned on fixture base 30b, a raised horizontal cross piece 66c which carries two (2) parallel alignment rails 66a, 66b having square cross sections which rails 66a, 66b lie in mold end-to-end indentations 67, 68. Each mold indentation 67 and 68 includes a horizontal wall 67a, 68a and a vertical wall 67b, 68b. Rails 66a, 66b have tapered tips 66d, 66e to assist in guiding and positioning mold halves 51', as each is slid in direction D to the position of FIG. 15. As a mold half 51' is moved back against block 66m it is aligned and the mold half 51' is thereafter accurately positioned as pins 72' and 73' engage and move, as necessary, the mold half 51' during fixture descent. The spacings between block 66m and rails 66a, 66b and mold 51 are exaggerated in FIG. 15. These tolerances are small enough to achieve the centering tolerances set out below.

Vertical position of core 14 in ball cup 46' is accomplished using machined collars 84, 85 which slip over pins 72', 73' as shown. Set screws 82 are used to hold collars 84, 85. The length of collars 84, 85 determines the distance between cup plate 44b and mold halves 51', 59' and thereafter the position of core 14 (not shown) in cup 46'. Cup 46' is not adjustable in this embodiment but is held in fixed relationship to plate 44b' with fasteners 83a–c.

As in the other fixture embodiment, core 14 can, using this embodiment, be located up to 0.005 of an inch in any direction from the theoretical center.

Prior to proceeding with cover formation regular mold halves 51b, 51c are preheated to 140–180° F., the prepolymer is preheated and degassed at 140–160° F. and the curative is also preheated and degassed at a temperature of 140–160° F. As so preheated, the prepolymer and curative both have approximately viscosities of 2000 cps.

The cover material used in the present method is polyurethane which is the product of a reaction between a polyurethane prepolymer and a curing agent. The polyurethane prepolymer is a product formed by a reaction between a polyol and a diisocyanate. The curing agent is either a polyamine or glycol. A catalyst may be employed to promote the reaction between the curing agent and the polyurethane prepolymer.

Suitable polyurethane prepolymers for use in the present invention are made from a polyol, such as polyether, polyester or polylactone, and a diisocyanate. Suitable diisocyanates for use in the present invention include 4,4'-diphenylmethane diisocyanate (MDI) and 3,3'-dimethyl-4,4'-biphenylene diisocyanate (TODI) and toluene diisocyanate (TDI).

Suitable polyether polyols include polytetramethylene ether glycol; poly(oxypropylene) glycol; and polybutadiene glycol. Suitable polyester polyols include polyethylene adipate glycol; polyethylene propylene adipate glycol; and polybutylene adipate glycol. Suitable polylactone polyols include diethylene glycol initiated caprolactone; 1,4-butanediol initiated caprolactone; trimethylol propane initiated caprolactone; and neopentyl glycol initiated caprolactone. The preferred polyols are polytetramethylene ether glycol; polyethylene adipate glycol; polybutylene adipate glycol; and diethylene glycol initiated caprolactone.

Suitable curatives for use in the present invention are selected from the slow-reacting polyamine group consisting of 3,5-dimethylthio-2,4-toluenediamine; 3,5-dimethylthio-2,6-toluenediamine; N,N'-dialkyldiamino diphenyl methane; trimethylene-glycol-di-p-aminobenzoate; polytetramethyleneoxide-di-p-aminobenzoate; or a difunctional glycol; and mixtures thereof. 3,5-dimethylthio-2,4-toluenediamine and 3,5-dimethylthio-2,6-toluenediamine are isomers and are sold under the trade name ETHACURE® 300 by Ethyl Corporation. Trimethylene glycol-di-p-aminobenzoate is sold under the trade name POLACURE 740M and polytetramethyleneoxide-di-p-aminobenzoates are sold under the trade name Polamine by Polaroid Corporation. N,N'-dialkyldiamino diphenyl methane is sold under the trade name UNILINK® by UOP.

Suitable difunctional glycols are 1,4-butanediol; 1,3-butanediol; 2,3-butanediol; 2,3-dimethyl-2,3-butanediol; dipropylene glycol; and ethylene glycol. Difunctional glycols are inherently slow-reacting.

Figure 6:
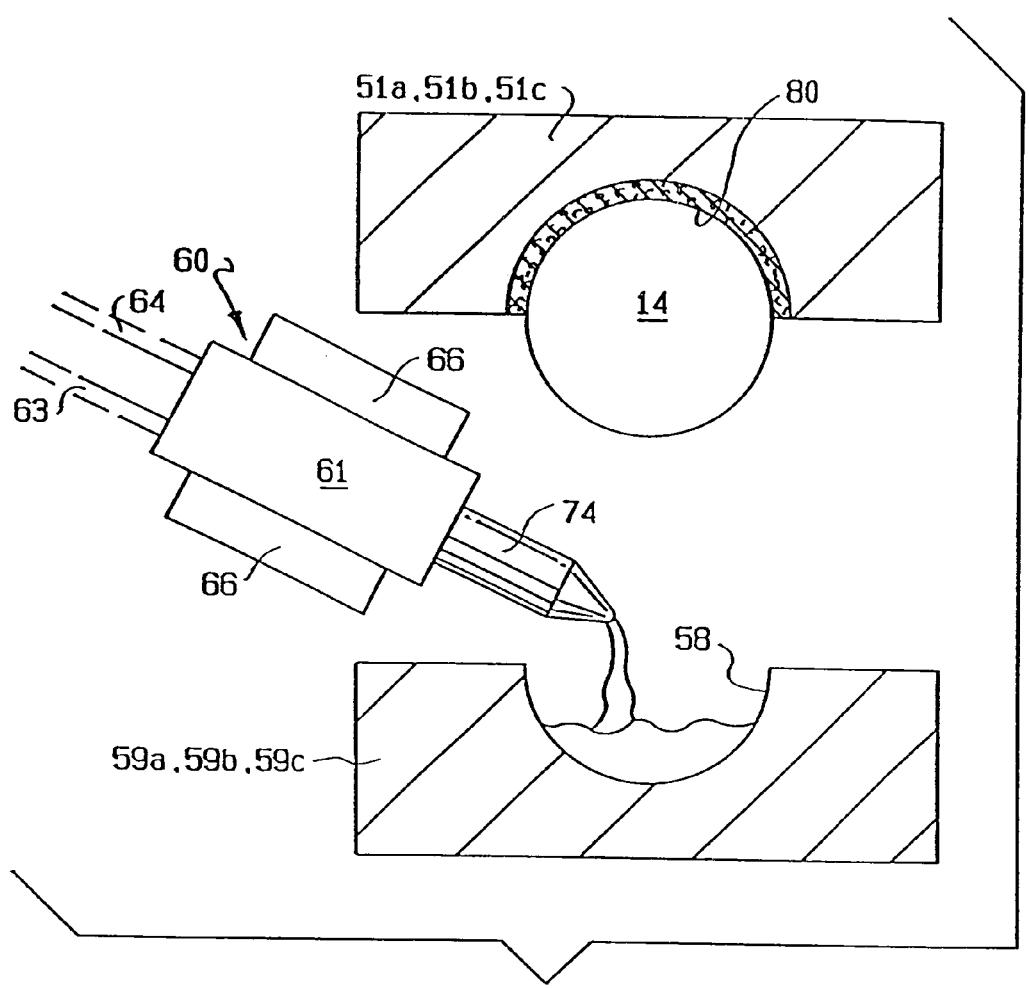
FIG. 6 shows apparatus for mixing polyurethane, dispensing it in a mold half and shows one mold half being inverted before mating with a second mold half.

To start the cover formation, mixing of the prepolymer and curative is accomplished in motorized mixer 60 (FIG. 6) including mixing head 61 by feeding through lines 63 and 64 metered amounts of curative and prepolymer. The mixer 60 is cooled by cooling jacket 66. Due to the exothermic reaction of prepolymer and curative as mixed, the mixing head temperature will tend to rise. To control such a rise, the mixing head temperature is maintained by cooling in a range appropriate for the specific urethane material and to attain a workable gel time. From the time mixing commences until the reacting material is fed into each top mold 51*a*, *b*, *c*, etc. or bottom mold half 59*a*, *b*, *c* etc. is about 4–7 seconds. Top preheated mold halves 51*a*, *b*, *c* etc. are filled and placed in fixture unit 30 using pins 72, 73 moving into holes 71*a*, 71*b* in each mold 51*a*, *b*, *c* etc. After the reacting materials have resided in top mold halves 51*a*, b, c, etc. for about 50–80 seconds, a core 14 is lowered at a controlled speed into the gelling reacting mixture by lowering frame unit 44 using an pneumatic powered arrangement not shown. Alternatively, electric or hydraulic systems may be used. Controlled lowering is accomplished by adjustment of the powered arrangement and by use of pneumatic controls not shown to lessen and preferably prevent air bubbles. Stop 39*b* limits movement downward. The amount of mixture introduced into each mold half 51*a* is 5.4–5.7 g. At a later time a bottom mold half 59 of a series of bottom mold halves 59*a*, 59*b*, etc. has similar mixture amounts introduced into its cavity 58 (FIG. 6).

Upon location of the coated core 14 in halves mold 51 *a*, *b*, *c* after gelling for 50–80 seconds, the vacuum is released in line 46*a* allowing core 14 to be released. Mold halves 51*a*, *b*, *c* with core 14 and solidified cover half 80 thereon is removed from the centering fixture unit 30, inverted (see FIG. 6) and mated with other mold halves 59*a*, *b*, *c* which, at an appropriate time earlier have had a selected quantity of reacting polyurethane prepolymer and curing agent introduced therein to commence gelling.

When a plurality of mold halves 51*a*, *b*, *c* etc. and 59*a*, *b*, *c* etc. are filled and clamped at one time, the following time sequence is preferred.

Figure 10B:
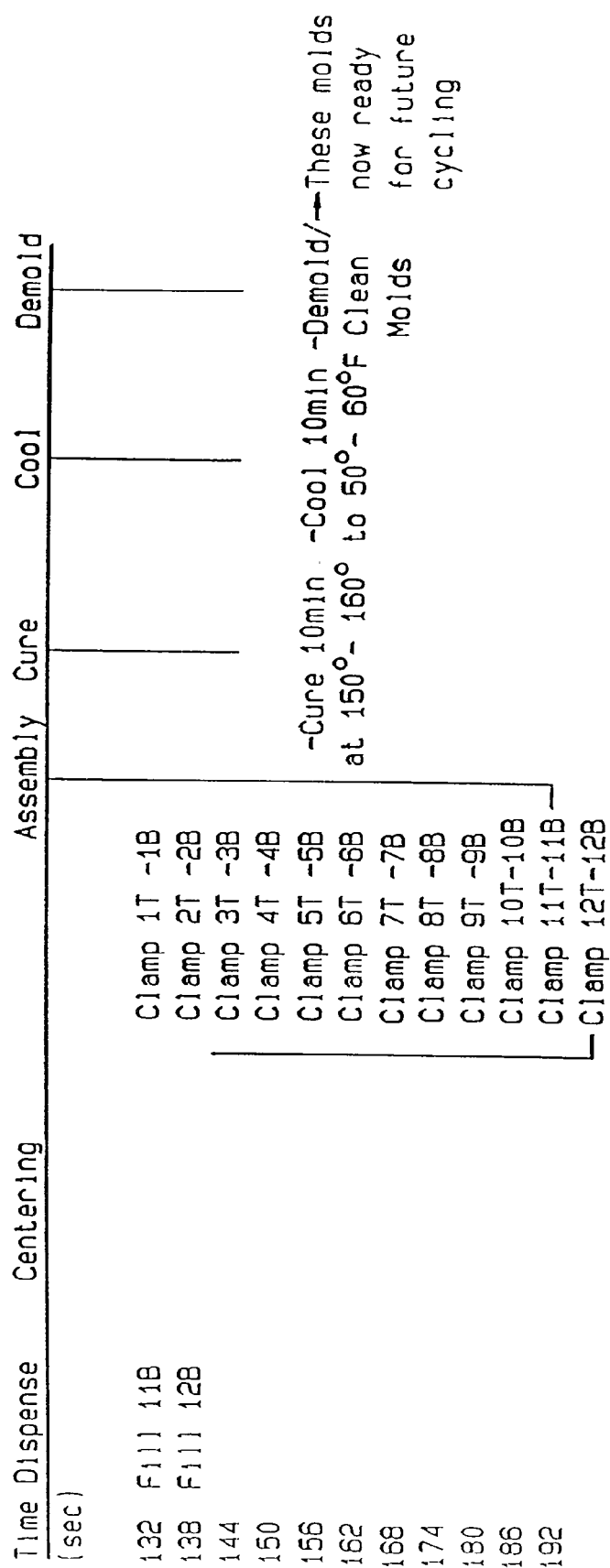
FIG. 10 is a table of process steps in a timed sequence.

The sequence of introducing the polyurethane mix into the top mold half 51*a* (1T) and its mate the bottom mold half 59*a* (1B) is as follows: Introduction of the mixed prepolymer and curative into the top mold 51*a* starts the time sequence which start is referred to herein as time zero. The top half mold 51*a* receives the mix first at time zero and shortly mold half is placed in fixture unit 30. The core is initially inserted in the mix located in top mold 51*a* at time 60 seconds (see FIG. 10). At time 72 seconds, bottom mold half 59*a* (1B) is filled and at time 132 seconds, the mold halves 51*a*, 59*a* (1T–1B) are mated and clamped. At time 126 seconds, the mix has been in top half 51*a* 126 seconds and mix has been in bottom half 50*a* for 60 seconds. The sequence of filling other mold halves 51*b* (2T) and 59*b* (2T) and so forth follows a similar pattern. Within this sequence of mixing and dispensing of the prepolymer and curative commences at −4 to −7 seconds.

The thorough mixing that takes place in mixer 60 for the period of time described provides an improved cover material. Mold halves 51, 53 are pre-heated to 160–190° F. The core is held in its fully-down position for 30–40 seconds and the vacuum is then released. Following clamping of mold halves, the clamped mold is put in a curing oven for approximately 10 minutes to reach a mold temperature of 140–180° F. followed by cooling for approximately 10 minutes to reach a mold temperature of 50–70° F.

The mold halves are clamped together under 400–600 psi pressure. The mold halves each contains sufficient reacting material to form hemispherical portions of the cover. Mold halves are held together for 10–15 minutes and thereafter cooled from 140° F.–180° F. to 50° F.–70° F. and then opened to demold the ball. Excess polyurethane is extruded from the mold cavity into sprue channels 51*s* forming solidified sprues not shown.

EXAMPLE I

A wound center was dipped in a 30% pre-vulcanized latex solution, drained and partially dried in a current of warm air. Remainder of drying was accomplished at room temperature. Latex penetration was approximately 50 mils. A mold half was preheated to approximately 160° F.

A mixture of 100 parts of Betathane 23.711, an MDI-based polyether prepolymer, 5.19 parts of titanium dioxide dispersion and 48.27 parts of Polamine 250 was prepared. Approximately 5.6 g of this mixture was dispensed into a heated mold cavity and allowed to thicken for approximately one minute. A dipped wound core with a diameter of 1.580" was placed in the bottom mold cavity by means of the centering fixture shown in FIG. 3. The core was held in a concentric position for approximately 40 seconds to allow the material to thicken further to support the core. The top heated mold half was then filled and the material allowed to thicken for approximately 1 minute. The top and bottom mold halves were then assembled and clamped by bolts or any conventional manner. The assembled mold was introduced into a curing oven and cured for 10 minutes at approximately 160° F. The assembled mold was then introduced into a cooling chamber for approximately 10 minutes to reach a mold temperature of 50–70° F.

The resulting cover was approximately 50 mils thick on a side and had a Shore D durometer of approximately 58–60 when measured after a two-day waiting period. Subsequently, the ball was painted and the cover was observed to be highly abrasion and cut resistant. Spin rate of this ball was approximately 100–200 rpm lower than a balata covered ball (Tour 100) with an acceptable velocity of 252.7 ft/sec.

EXAMPLE II

The steps of Example I were carried out except that the wound core was not dipped in a latex solution.

EXAMPLE III

The steps of Example I were carried out except that a solid core was used.

EXAMPLE IV

The steps of Example I were carried out with a solid core without a latex dip.

Figure 11:
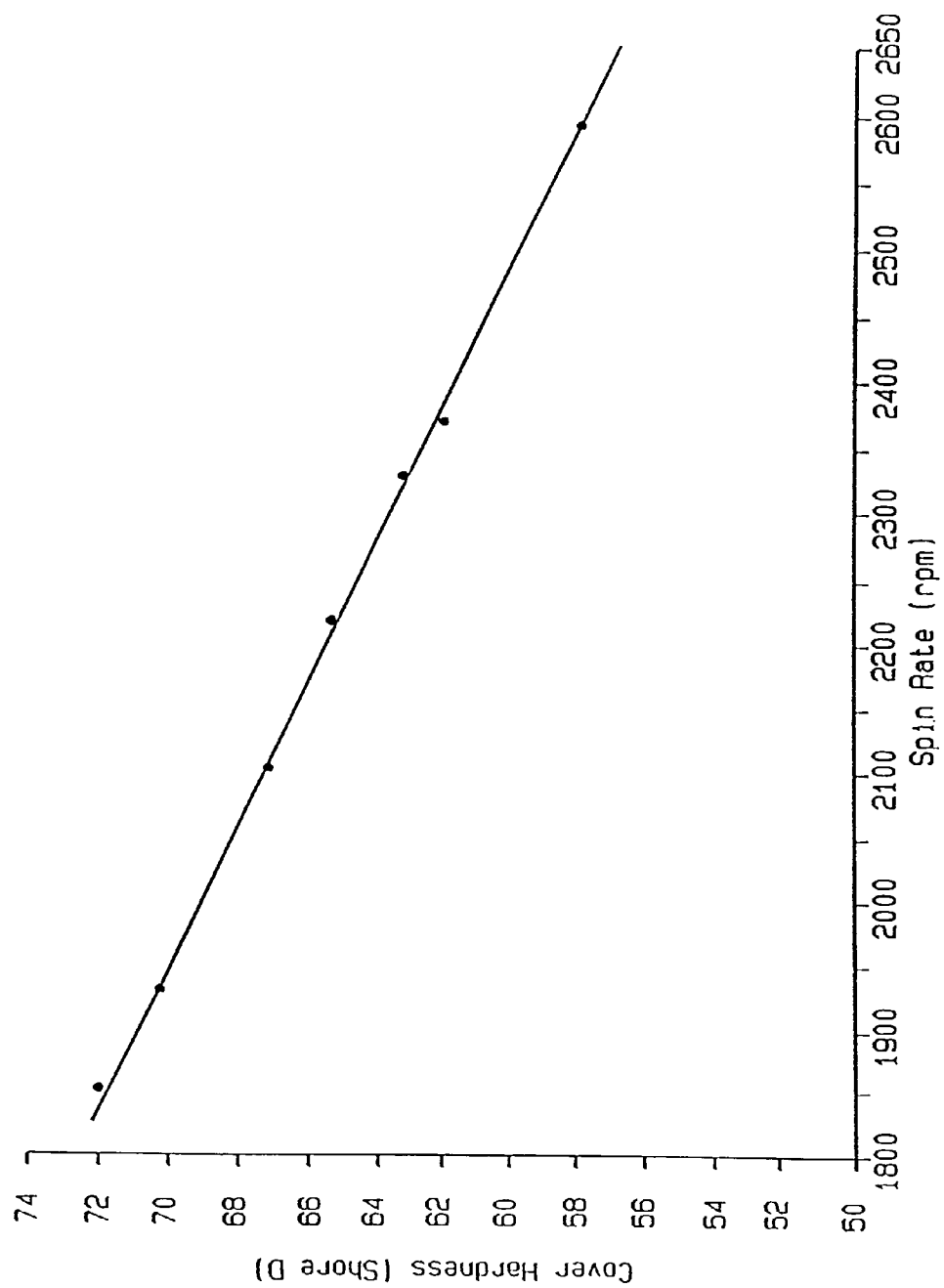
FIG. 11 is a graph plotting hardness vs. spin rate.

A range of core sizes that can be employed in this invention, whether dipped or non-dipped, is 1.560" to 1.610" was determined by previous testing that as core size of the ball increases, ball velocity increases (FIG. 11). However, if the durometer of the cover remains the same, spin rate of the ball was materially unaffected. Spin rate can be changed by modifying the durometer of the cover by selecting different ratios of materials or combining other materials. Cover durometers of 48 Shore D to 72 Shore D are attainable with the preferred range of 58–62 for this type of ball.

Figure 12:
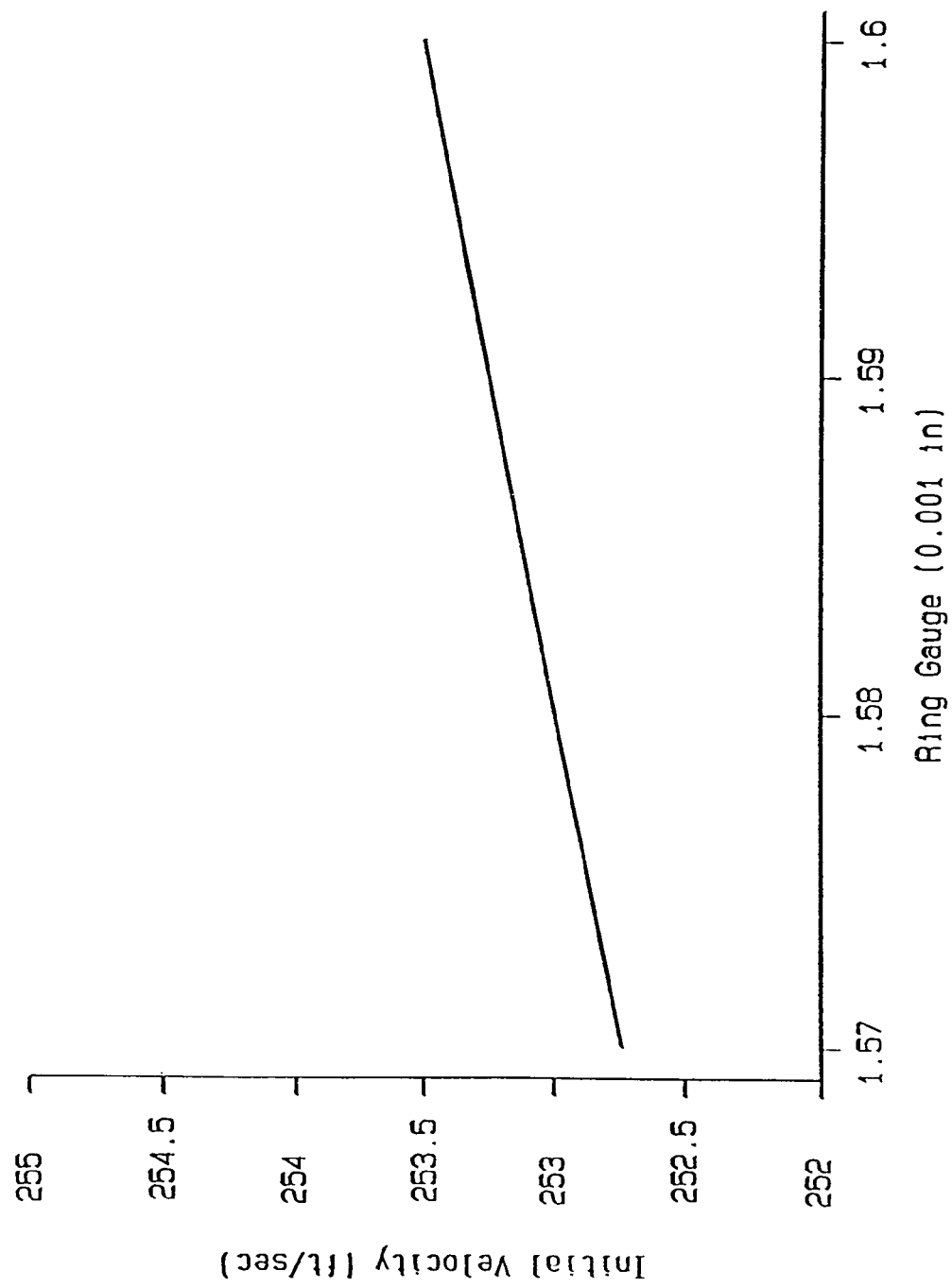
FIG. 12 is a graph plotting initial velocity vs. wound ball size.

The relationship between durometer and spin rate was determined to be linear with harder durometer covers producing lower spin rates (FIG. 12).

We claim:

1. A method of making a golf ball having a core and outer cover and using first and second mold halves, comprising the steps of:
   a) placing a first portion of polyurethane in a first cavity of the first mold half;
   b) allowing said first portion of polyurethane to partially cure to a selected state of gel in said first cavity;
   c) positioning said core within said first cavity while vertically and laterally centering said core within said first cavity to mold said first portion of said polyurethane at said selected state of gel around said core;
   d) placing a second portion of polyurethane in a second cavity of the second mold half at a time subsequent to the placing of said first portion of polyurethane in said first cavity of said first mold half;
   e) allowing said second portion of polyurethane to partially cure to the same selected state of gel as the first portion was when the core was moved into said first cavity of said first mold half;
   f) mating said first mold half, having the core and first portion of polyurethane against said second mold half when said second portion of said polyurethane in said second cavity of the second mold half is at the same selected state of gel as the first portion was when the core was moved into said first cavity of said first mold half; and
   g) curing the polyurethane in the mated mold halves.

2. The method of claim 1 further comprising the step of encapsulating the core with coating prior to placing the core in the first cavity.

3. The method of claim 2 wherein the step of encapsulating the core is comprised of dipping the core in a thermosetting latex bath.

4. The method of claim 1 further comprising inserting an alignment pin into an alignment aperture of the first mold half when the core is moved into the first cavity of the first mold half so the core is centered in the first mold cavity.

5. The method of claim 1 further comprising limiting movement of the core by stopping vertical movement at a predetermined height with a stop member.

6. The method of claim 1 further comprising:
   a) aligning the first mold half with an alignment rail to position the first mold half in a first direction; and
   b) aligning the first mold half with a second member to position the first mold half in a second direction perpendicular to the first direction.

7. The method of claim 1 further comprising preheating the mold halves to 140°–180° F.

8. The method of claim 1 further comprising mixing a prepolymer and a curative to form the polyurethane.

9. The method of claim 8 further comprising preheating the prepolymer and curative to 140°–160° F.

10. The method of claim 8 wherein the prepolymer and curative are mixed for about 4–7 seconds.

11. The method of claim 1 wherein the step of allowing the first portion of polyurethane to partially cure to a selected state of gel comprises allowing the polyurethane to reside in the first cavity of the first mold half for about 50 to 80 seconds.

12. A method of making a golf ball having a core and using first and second mold members, comprising the steps of:
   a) placing a first portion of polyurethane in a first cavity of the first mold member;
   b) curing the first portion in the first cavity for a selected amount of time to a selected state of gel;
   c) positioning said core within said first cavity while vertically and laterally cent said core within said first cavity to mold said first portion of said polyurethane at said selected state of gel around said core;
   d) placing a second portion of polyurethane in a second cavity of the second mold member at a time subsequent to the placing of said first portion of polyurethane in said first cavity of said first mold member;
   e) curing the second portion in said second cavity for said selected amount of time to said selected state of gel;
   f) mating said first mold member, having the core and first portion of polyurethane against said second mold member when said second portion of said polyurethane in said second cavity of the second mold member is at the same selected state of gel as the first portion was when the core was moved into said first cavity of said first mold member; and
   g) curing the polyurethane in the mated mold members.

13. The method of claim 12 wherein the step of curing the first portion of polyurethane for a selected amount of time is about 50 to 80 seconds.

14. The method of claim 1, wherein the step of forming a core comprises molding a solid core.

15. The method of claim 1, further comprising the step of forming a layer over the core, wherein the layer comprises a thermoset material.

16. The method of claim 15, wherein the layer comprises a latex.

17. The method of claim 1 further comprising the step of preheating the first and second mold halves to 140°–180° F.

18. The method of claim 12, wherein the step of forming a core comprises molding a solid core.

19. The method of claim 12, further comprising the step of forming a layer over the core, wherein the layer comprises a thermoset material.

20. The method of claim 19, wherein the layer comprises a latex.

21. The method of claim 12 further comprising the step of preheating the first and second mold members to 140°–180° F.

* * * * *